Figure 1:
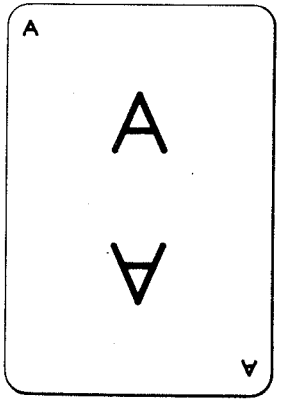

Feb. 11, 1941.   G. A. McCAULLEY   2,231,020
MUSICAL INSTRUCTION DEVICE
Filed Feb. 7, 1939   2 Sheets-Sheet 1

INVENTOR
GEORGE ALBERT McCAULLEY
BY HIS ATTORNEYS

Feb. 11, 1941.  G. A. McCAULLEY  2,231,020
MUSICAL INSTRUCTION DEVICE
Filed Feb. 7, 1939  2 Sheets-Sheet 2

5♭ 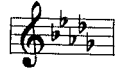

5 FLATS
FLAT NOTES  B, E, A, D, G.

KEY OF
D♭ MAJOR
    D♭ E♭ F  G♭ A♭ B♭ C  D♭
B♭ MINOR
HARMONIC  B♭ C  D♭ E♭ F  G♭(A♮) B♭
ASCENDING MELODIC
    B♭ C  D♭ E♭ F  (G♮ A♮) B♭
DESCENDING MELODIC
    B♭ C  D♭ E♭ F  G♭ A♭ B♭

5♯ 

5 SHARPS
SHARP NOTES  F, C, G, D, A.

KEY OF
B MAJOR
    B C♯ D♯ E  F♯ G♯ A♯ B
G♯ MINOR
HARMONIC  G♯ A♯ B  C♯ D♯ E  (F×)G♯
ASCENDING MELODIC
    G♯ A♯ B  C♯ D♯(E♮ F×)G♯
DESCENDING MELODIC
    G♯ A♯ B  C♯ D♯ E  F♯ G♯

Fig. 2.

CH.

CHROMATIC
WITH MAJOR KEY SIGNATURE
ASCENDING
HARMONIC FORM
  C D♭ D♮ E♭ E♮ F F♯ OR G♭ G♮ A♭ A♮ B♭ B♮ C
MELODIC FORM
  C C♯ D D♯ E F F♯ G G♯ A A♯ B C
WITH MINOR KEY SIGNATURE
ASCENDING
HARMONIC FORM
  A B♭ B♮ C C♯ D D♯ E F F♯ G G♯ A
MELODIC FORM
  A A♯ B C C♯ D D♯ E F F♯ G G♯ A

Fig. 6. 

Fig. 9.

K.O.

KEY
OPTIONAL

Fig. 8.

W.T.

WHOLE
TONE

Fig. 10.

INVENTOR
GEORGE ALBERT McCAULLEY
BY HIS ATTORNEYS
Howson and Howson

Patented Feb. 11, 1941

2,231,020

UNITED STATES PATENT OFFICE 2,231,020

MUSICAL INSTRUCTION DEVICE

George Albert McCaulley, New York, N. Y.

Application February 7, 1939, Serial No. 255,136

8 Claims. (Cl. 273—152)

This invention relates to music educational devices, and more particularly to devices of this character for the demonstration and exercise of musical theory.

The main object of the invention is to cause the student to select units from different series of physical elements and assemble the same to make up sequencies corresponding to note combinations inherent in music, such as scales and chords.

In many of the major scales, sharp notes or flat notes occur according to the key signature, and it is a further object to cause the student to select the elements corresponding to the proper sharp or flat notes, as well as the proper natural notes in making up the note combination.

Another object of the invention is to provide a device of this character which causes the student to make adjustments of physical elements corresponding to the actual adjustments inherent in music. For example, in certain minor scales, the sixth or seventh notes are variables and are raised to conform to the harmonic and ascending melodic forms, independent of the key signature. This technical condition and its requirements constitute one of the most difficult steps in the study of music, and it is therefore a particular object of this invention to provide an educational device which will give visual indication of the occasion of such raised notes, and which will cause the student to make physical adjustment corresponding to the requirements of the musical condition.

According to the present invention a set of indicia bearing elements is provided which can be manipulated or arranged in physical relation to correspond to the abstract musical relations. These elements may be cards, tiles, pieces, men, counters, keys and the like. The set of elements comprises any one or more of the following three types which may be used singly but preferably in combination.

(1) *Note elements* according to the musical alphabet, a respective element for each of the series ABCDEFG. Preferably also separate note elements are provided for the sharps and flats. These latter separate note elements may comprise an additional element for each of the series A sharp, B sharp, C sharp, D sharp, E sharp, F sharp and G sharp; and another additional element for each of the series A flat, B flat, C flat, D flat, E flat and G flat. Alternately a plurality of identical flat elements and a plurality of identical sharp elements may be employed, which are to be used conjointly with a letter note card to constitute the sharp or flat note required.

(2) *Key elements* one for each key, preferably related according to each major and its relative minor key. Thus the key element for the key of no sharps or flats being C major, also designates its relative minor as A minor. The key element for the key of one sharp being G major, also designates its relative minor as E minor, while the key of one flat being F major, the key element also designates the relative minor as D minor. The elements for the keys of larger numbers of sharps or flats are correspondingly designated.

Preferably each key element bears its major scale and one or more of the three forms of the relative minor scales. The key elements for keys having flats or sharps preferably designate which notes are the sharps and flats respectively for that key. In these minor scales, indicia are preferably provided to designate the sixth or seventh note or both which is raised by an accidental. For this purpose brackets may be provided, for example, ABCDEF (G sharp) A, or a star or other symbol, preferably a symbol not having any usual musical significance may be used.

(3) *Raised elements* are provided with distinguishing indicia, constituting preferably a supply of identical elements to be employed with one of the note elements to meet the raised note condition signified by the brackets in the minor scale on the key card. Alternately elements similar to the note cards but bearing different indicia, such as double sharps, may be employed.

In the use of these elements, a key card is selected or assigned by chance or design to initiate the operation on the part of the player or student, who selects from the note elements those necessary to build up a scale or note combination designated by the key element. In assembling a scale or note combination in a minor key, the bracket or other indicia associated with the sixth or seventh note of the minor scale on the key element informs the student that a raised note is required. This condition is further emphasized by the proper raised element which must be selected and utilized along with the proper note element to satisfy the raised note condition. This manipulation, which is required by the nature of the elements, impresses upon the mind of the student not only the occasions upon which adjustments must be made, but also the nature of the adjustments required.

While the form, material or construction of any one or more of the types of elements may be greatly varied as hereinbefore suggested, the preferred embodiment comprises a set of playing or instruction cards, as illustrated in the accompanying drawings, in which—

Figure 2:
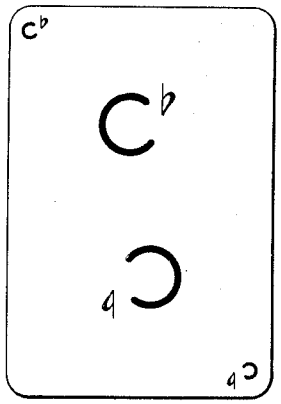
Figure 3:
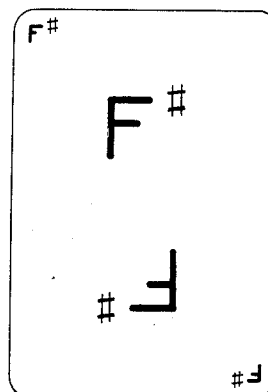
Figure 4:
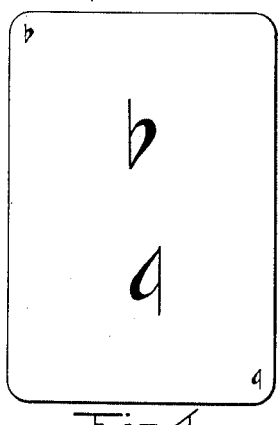
Figure 5:
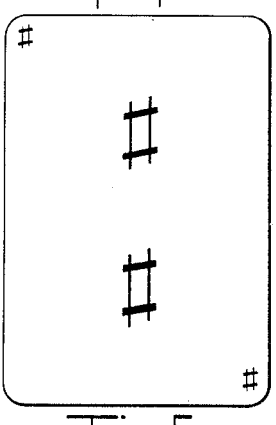
Figure 11:
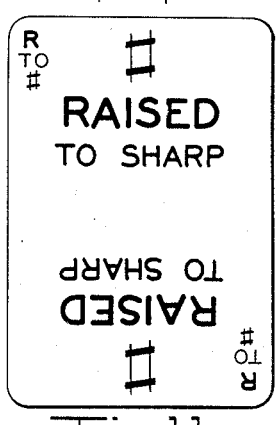
Figure 12:
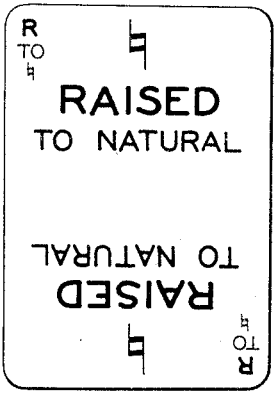
Figure 13:
Figure 14:
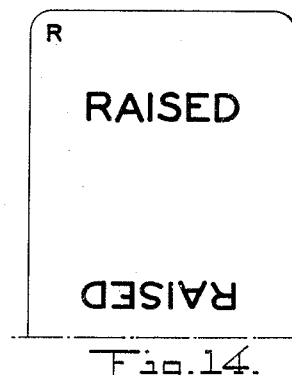

Figure 1 is a natural note playing card;
Figure 2 is a flat note playing card;
Figure 3 is a sharp note playing card;
Figure 4 is an example of an alternate flat card;
Figure 5 is an example of an alternate sharp card;
Figure 6 is a flat key card;
Figure 7 is a broken view of a sharp key card;
Figure 8 is a broken view of an optional key card;
Figure 9 is a broken view of a chromatic key card;
Figure 10 is a broken view of a whole tone key card;
Figure 11 is a raised to sharp card;
Figure 12 is a raised to natural card;
Figure 13 is a raised to double sharp card; and
Figure 14 is a general raised card.

Referring more particularly to the drawings, the elements disclosed only by way of example as playing cards comprise note cards respectively A, B, C, D, E, F, G; A sharp, B sharp, C sharp, D sharp, E sharp, F sharp, G sharp; and A flat, B flat, C flat, D flat, E flat, F flat and G flat. The indicia for each note card is preferably printed in each upper left and reversed lower right hand corner thereof. Optionally additional indicia, words or syllables may be added, and each note card may have thereon the position of the note in each of the respective keys.

The deck or pack of cards includes one or more complete series of natural note cards, the A note card shown in Figure 1 being illustrative of the series A to G inclusive. The pack also includes one or more series of particular flat and sharp note cards, the C flat card shown in Figure 2 being illustrative of the series A flat to G flat inclusive, and the F sharp of Figure 3 being illustrative of the series A sharp to G sharp inclusive.

As a modification the particular flat and sharp note series of Figures 2 and 3 may be omitted, and the deck made up of one or more series of natural note cards of Figure 1 and in addition, a plurality of identical general respective flat and sharp cards as shown in Figures 4 and 5. With this modification, instead of selecting the C sharp card of the Figure 3 series, for example, the player or student selects a C natural card of the Figure 1 series and uses with it a general sharp card of the Figure 5 plurality. Of course, both forms may be included in the same deck, and used optionally by the player or student.

The key cards each bear respectively one or more of the following designations relative to its particular key, all of which are illustrated: The number or absence of sharps or flats; the signature, including the staff, clef, and position thereon of the sharp or flat signs; the major key name; the major scale; the minor key name which is relative to that major; and the harmonic, the ascending melodic, and/or the descending melodic scales of that relative minor key.

The key card shown in Figure 6 is illustrative of the key of five flats, and has the number and sign in the conventional corners, and the number with the name of the sign spelled out at the top of the card. Optionally the key signature with the clef and staff and the respective flats properly positioned may be printed above the spelled word. This is followed by the letters of the notes which are flats in that key: B, E, A, D, G.

Below the general heading "Key of" is printed the name of the major key, in this instance D flat major, followed by the scale thereof spelled out in letters with the respective flat notes indicated by the flat sign.

Below the major key name and scale are the names and scales of the relative minor, in this instance B flat minor. In the harmonic minor scale the seventh note is designated by a distinguishing mark, in this instance the A with the natural sign being inclosed in brackets.

In the ascending melodic minor scale both the sixth and the seventh notes are distinguished, the G natural and A natural being inclosed in brackets. The descending melodic minor scale having no raised notes, does not require this indicia.

The key card shown in Figure 6 is illustrative of the sub series from one to seven flats which are correspondingly designated. There is also a sub series of sharp key cards from one to seven sharps, Figure 7 illustrating the five sharp key card of this sub series which are accordingly designated corresponding to the above description of the flat series. Of course a key card is provided for the key of no sharps or flats, C major, with its designation and scales of its relative minor, A minor, in its various forms, with their raised notes having distinguishing marks as described.

Preferably the key card series is amplified by the inclusion of one or more cards such as shown in Figures 8, 9 and 10 which are in the nature of wild or blank cards. Figure 8 is designated to permit the player or student to choose any key. Figure 9 requires him to assemble a chromatic scale, while Figure 10 is for the assembly of a whole tone scale. The cards of Figures 9 and 10 may be optional within their designations, or the key therefor may be determined by the use therewith of one of the key cards. The card of Figure 9 is shown as having printed thereon a typical chromatic scale, but this may be omitted if desired, or each card of this type may have a different chromatic scale thereon to constitute a series.

The raised cards are illustrated on Figures 11 to 14 inclusive and are provided with indicia to signify the raising function. In the form shown the word "Raised" is prominently displayed, and the initial R is shown in the conventional corners.

The species shown in Figures 11 to 13 are respectively designated as raised to sharp, natural and double sharp, the word and the conventional sign being employed for each. With this species a plurality of identical cards of each form should be provided.

The raised card shown in Figure 4 omits the designation of the particular kind of raise, and may be included with those of Figures 11, 12 and 13 as a wild or optional card, or for a simpler exercise the form of Figures 11, 12 and 13 may be omitted, and all of the raised cards may be alike, in the form of Figure 14.

It will be understood that in the complete deck of cards made up of the above-described units, the number of types and the number of each type or series may be made greater or smaller as desired, and the following tabulation is merely a preferred example:

```
Note cards
    4 each of the natural series of Figure 1__    28
    4 each of the flat series of Figure 2_____    28
    4 each of the sharp series of Figure 3___     28

Total note cards_____          84
Raised cards
    1 raised general, Figure 14_____       1
    4 raised to sharp, Figure 11_____       4
    2 raised to double sharp, Figure 13_____       2
    4 raised to natural, Figure 12_____       4

Total raised cards_____          11
    Total playing cards_____          95
Key cards
    Key signature cards Figures 6 and 7____       15
    Optional_____        1
    Chromatic _____        1
    Whole tone_____        1

Total key cards_____          18
    Total deck_____         113
```

In explaining the use of these cards, it will be assumed that the key card of Figure 7 for example is assigned to a student or player by deal of the cards or any other determination, and that the ascending melodic minor scale has been determined by further assignment. The student or player will assemble the natural note card B of the series according to Figure 1, and sharp note cards for G sharp, A sharp, C sharp and D sharp from the series according to Figure 3. Alternately these sharp notes may be supplied by natural note cards G, A, C and D according to Figure 1 each supplemented by a plain sharp card according to Figure 5.

For the sixth note, the natural note card E of the Figure 1 series is selected, and along with it a raised to sharp card of Figure 11 is employed. For the seventh note, a sharp note card F of the Figure 1 series is employed, and a raised to double sharp card of Figure 13 is selected for use therewith or substitution therefor. For either the sixth or seventh note, the general raised card of Figure 14 may be used regardless of the type of raise required, as a sort of trump or wild card.

The above basic scheme is employed throughout although variations of interest are provided by the cards of Figures 8, 9 and 10. When the player or student is assigned an optional key card according to Figure 8, he may choose a key of his own preference in which he is to assemble the scale or note combination. With the chromatic card of Figure 9, he will assemble a chromatic scale, preferably one differing from those shown on the card as a model. With the whole tone card of Figure 10 he will assemble a whole tone scale or note combination, preferably with no guide other than his own knowledge of the construction of the whole tone scale or note combination.

From the foregoing description of the cards and their relation it will be readily apparent that a great variety of games may be played or exercises practiced or demonstrations conducted. The general plan of substantially any of the standard games may be followed, with the exception that the cards according to the present invention require an adjustment to be made by the player or student corresponding to the inherent requirements of music theory.

The educational value of these operations is apparent in visually illustrating the relationships of major and minor scales, both in relative and opposite modes; illustrating key cycles, transpositions from one key to another; chords and their inversions, common chord tones in modulations, and so on throughout the field of music relations.

Ear training or sight singing may be combined with these demonstrations, and as the deck contains at least one of each of the musical note names, the same can be used for a great variety of illustrative purposes. The raised cards are of great value in demonstrating the raised variables in minor scales.

The cards may also be used in purely recreational games, and it is to be understood that the form and arrangement of the designations on the cards may be varied and instructional information or ornamentation may be added as desired.

I claim:

1. In a set of playing or instruction cards, a series of cards each bearing a note combination of the major scale of a different key and in addition the corresponding note combination of at least one of the relative minor scales.

2. In a set of music educational playing or instruction elements, a series of respective key elements each bearing a note combination of a different major scale and the corresponding note combination of at least one of the relative minor scales, the minor scale note combination having indicia for the location of a raised note condition of said minor scale note combination.

3. In a set of playing or instruction elements, a key element bearing at least one note combination of a scale selected from the major and relative minor scales of a key, and including the occasion of a raised note in the combination, a series of respective note elements adapted to be selected and arranged to correspond respectively to the notes of said combination other than said raised note, and a raised element constituting another selected element to correspond to said raised note.

4. In a device of the character described, in combination, a key element bearing a note combination of a minor key scale and having variables of said minor key scale which are to be raised by an accidental independent of the key signature, and a series of elements adapted to be selected and arranged to build up the minor scale note combination of the key element, said series of elements including means for modifying certain of said elements to supply the requirement of the variables and effect the raising thereof by an accidental.

5. In a set of music educational playing or instruction elements, a key element bearing a note combination of a minor scale, said note combination including one of the two notes constituting the sixth and seventh notes of said relative minor scale, said included note having indicia for the location of a variable note condition of said minor scale which requires raising by an accidental.

6. In a set of music educational playing or instruction elements, a key element bearing a note combination of a minor scale, said note combination including one of the two notes constituting the sixth and seventh notes of said minor scale, said included note constituting a variable note condition of said minor scale which requires raising by an accidental, in combination with a series of note elements adapted to be selected and arranged to build up the note combination with the exception of said variable, and a raising element adapted to correspond to said variable which is raised by an accidental.

7. In a set of music educational playing or instruction elements, a key element bearing a note combination of a major scale, said key element bearing also the corresponding note combination of one of the relative minor scales, the minor scale note combination including one of the two notes constituting the sixth and seventh notes of said relative minor scale, in combination with a series of respective note elements adapted to be selected and arranged to build up said note combinations, and an element differing from said note elements and cooperating therewith to enable one of said selected note elements to supply the requirement of said included note raised by an accidental.

8. In a set of music educational playing or instruction elements, for use in deriving from a note combination of the major scale the corresponding note combination of one of the relative minor scales, the minor scale note combination including one of the two notes constituting the sixth and seventh notes of said relative minor scale which requires raising by an accidental, in combination with a series of cards adapted to build up the notes of said note combination with the exception of said variable which requires raising by an accidental and a card differing from all the others and adapted to constitute said included note which requires raising by an accidental.

GEORGE ALBERT McCAULLEY.